__United States Patent__ [19]

Kobylinski

[11] Patent Number: 5,112,527

[45] Date of Patent: May 12, 1992

[54] PROCESS FOR CONVERTING NATURAL GAS TO SYNTHESIS GAS

[75] Inventor: Thaddeus P. Kobylinski, Lisle, Ill.

[73] Assignee: Amoco Corporation, Chicago, Ill.

[21] Appl. No.: 679,095

[22] Filed: Apr. 2, 1991

[51] Int. Cl.$^5$ ............................................... C07C 1/02
[52] U.S. Cl. .................................................. 252/373
[58] Field of Search ........................................ 252/373

[56] References Cited

U.S. PATENT DOCUMENTS

| | | | |
|---|---|---|---|
| 3,446,609 | 5/1969 | Reinmuth et al. | 48/215 |
| 3,684,689 | 8/1972 | Patton et al. | 208/54 |
| 3,840,355 | 10/1974 | Crouch | 48/212 |
| 3,920,579 | 11/1975 | Slater | 252/373 |
| 4,042,344 | 8/1977 | Callcott et al. | 48/197 R |
| 4,153,410 | 5/1979 | Diem et al. | 431/5 |
| 4,185,966 | 1/1980 | Frie et al. | 48/212 |
| 4,260,521 | 4/1981 | Kostka | 252/443 |
| 4,390,347 | 6/1983 | Dille et al. | 48/197 R |
| 4,390,348 | 6/1983 | Dille et al. | 48/197 R |
| 4,451,578 | 5/1984 | Setzer et al. | 502/303 |

*Primary Examiner*—Howard T. Mars
*Assistant Examiner*—Kimberly J. Kestler
*Attorney, Agent, or Firm*—Nick C. Kottis; William H. Magidson; R. J. Wagner

[57] ABSTRACT

A process for converting natural gas to synthesis gas includes the steps of subjecting a homogeneous mixture of natural gas and air to partial oxidation in the presence of a bifunctional partial oxidation/steam reforming catalyst and a sufficient amount of water to control reaction temperature, and subjecting the resulting product to steam reforming in order to substantially completely convert unconverted alkanes to carbon monoxide and hydrogen.

30 Claims, 1 Drawing Sheet

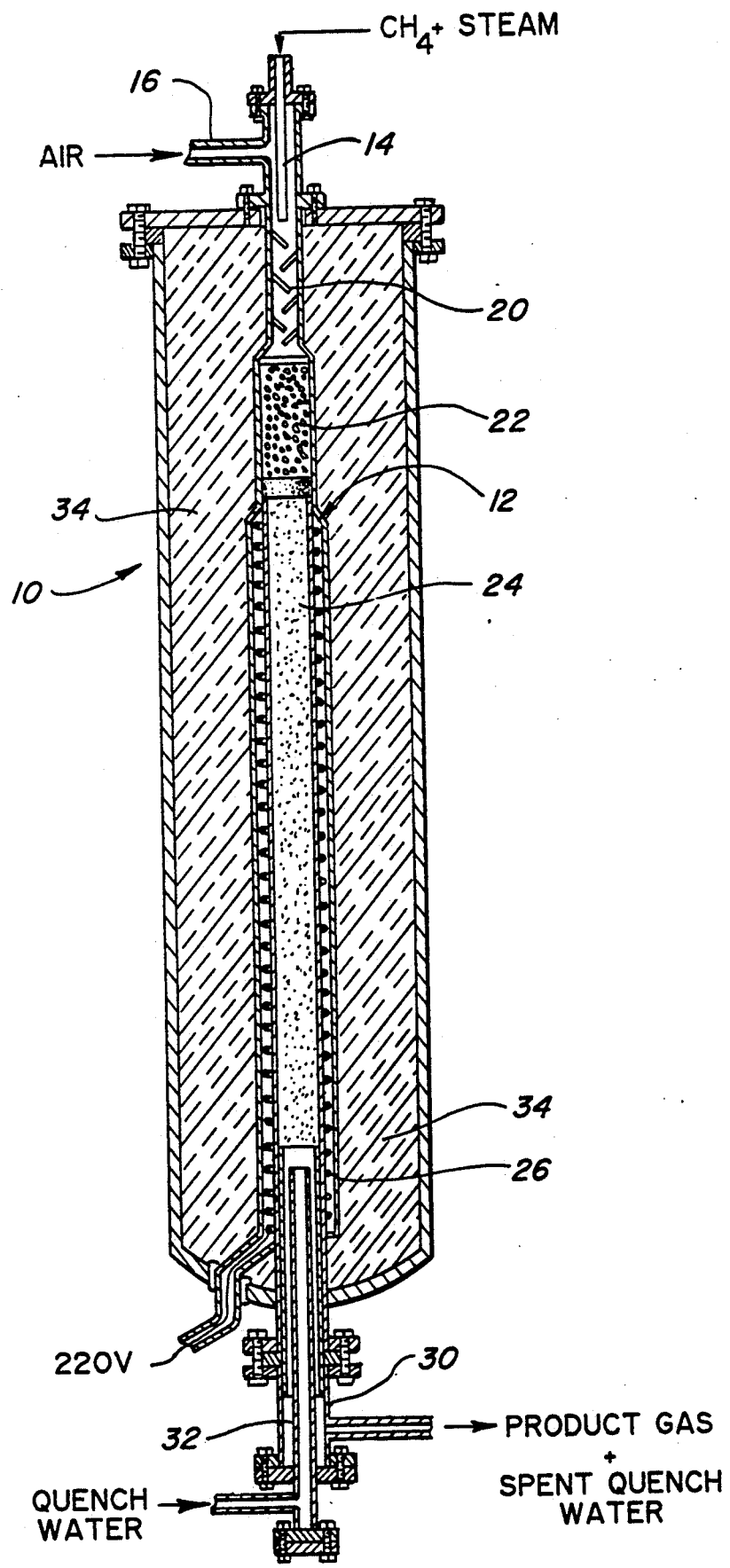

PROCESS FOR CONVERTING NATURAL GAS TO SYNTHESIS GAS

BACKGROUND OF THE INVENTION

1. Field of the Invention

This invention relates to the production of synthesis gas and, more particularly, this invention relates to the catalytic conversion of natural gas or other forms of gaseous lower alkanes to synthesis gas by means of partial oxidation and steam reforming.

2. Description of Related Technology

As is well known in the art, synthesis gas ("syngas") is a mixture of carbon monoxide and molecular hydrogen, generally having a hydrogen to carbon monoxide molar ratio in the range of 1:5 to 5:1, and which may contain other gases such as carbon dioxide. Synthesis gas has utility as a feedstock for conversion to alcohols, olefins, or saturated hydrocarbons (paraffins) according to the well known Fischer-Tropsch process, and by other means. Synthesis gas is not a commodity; rather, it is typically generated on-site for further processing. One potential use for synthesis gas is as a feedstock for conversion to high molecular weight (e.g. $C_{50}+$) paraffins which provide an ideal feedstock for hydrocracking for conversion to high quality jet fuel and superior high cetane value diesel fuel blending components. Another potential application of synthesis gas is for large scale conversion to methanol.

In order to produce high molecular weight paraffins in preference to lower molecular weight (e.g. $C_8-C_{12}$) linear paraffins, or to synthesize methanol it is desirable to utilize a synthesis gas feedstock having an $H_2:CO$ molar ratio of about 2:1 or less. As is well known in the art, Fischer-Tropsch syngas conversion reactions using syngas having relatively high $H_2:CO$ ratios produce hydrocarbon products with relatively large amounts of methane and relatively low carbon numbers. For example, with an $H_2:CO$ ratio of about 3, relatively large amounts of $C_1-C_8$ linear paraffins are typically produced. These materials are characterized by very low octane value and high Reid vapor pressure, and are highly undesirable for use as gasoline.

Lowering the $H_2:CO$ molar ratio alters product selectivity by increasing the average number of carbon atoms per molecule of product, and decreases the amount of methane and light paraffins produced.

Thus, it is desirable for a number of reasons to generate syngas feedstocks having molar ratios of hydrogen to carbon monoxide of about 2:1 or less.

Prior methods for producing synthesis gas from natural gas (typically referred to as "natural gas reforming") can be categorized as (a) those relying on steam reforming where natural gas is reacted at high temperature with steam, (b) those relying on partial oxidation in which methane is partially oxidized with pure oxygen by catalytic or noncatalytic means, and (c) combined cycle reforming consisting of both steam reforming and partial oxidation steps.

Steam reforming involves the high temperature reaction of methane and steam over a catalyst to produce carbon monoxide and hydrogen. This process, however, results in production of syngas having a high ratio of hydrogen to carbon monoxide, usually in excess of 3:1.

Partial oxidation of methane with pure oxygen provides a product which has an $H_2:CO$ ratio close to 2:1, but large amounts of carbon dioxide and carbon are coproduced, and pure oxygen is an expensive oxidant.

An expensive air separation step is required in combined cycle reforming systems, although such processes do result in some capital savings since the size of the steam reforming reactor is reduced in comparison to a straightforward steam reforming process.

Thus, it is desirable to lower the cost of syngas production as by, for example, reducing the cost of the oxygen plant, including eliminating the air separation step, while improving the yield as by minimizing the coproduction of carbon, carbon dioxide and water, in order to best utilize the product for a variety of downstream applications.

SUMMARY OF THE INVENTION

It is an object of the invention to overcome one or more of the problems described above.

According to the invention, a process for converting gaseous lower alkanes (e.g. natural gas) to synthesis gas having a desirably low $H_2:CO$ molar ratio (e.g. about 2:1 or less) is provided wherein a homogeneous mixture of lower alkanes and air is subjected to partial oxidation over a highly active bifunctional (partial oxidation/steam reforming) catalyst at a reaction temperature below the decomposition temperature of the alkanes for a sufficiently short time period whereby complete oxidation of a substantial portion of the alkanes is avoided, and thereafter reacting the resulting product mixture of hydrogen, carbon monoxide and unconverted alkanes in the presence of a steam reforming catalyst and water to convert the alkanes to hydrogen and carbon monoxide.

The partial oxidation reaction is carried out in the presence of a small amount of water which is added to the system or produced by the complete oxidation of a portion of the alkane feed in order to maintain the reaction temperature below the desired maximum.

Temperature control of the partial oxidation reaction is effected by thorough mixing of the air and alkanes and by the endothermic nature of the steam reforming reaction in the partial oxidation step of the process.

By selection of a highly active partial oxidation catalyst having also a high activity for steam reforming, it is possible to control the temperature in the reaction zone and to maintain the partial oxidation reaction temperature below the decomposition temperature of the alkanes, thus avoiding carbon deposition in the partial oxidation catalyst. The use of a highly active bifunctional partial oxidation catalyst allows the use of a relatively small catalyst bed and thus a short residence time which enhances temperature control of the highly exothermic partial oxidation reaction. A short residence time also favors partial, rather than complete oxidation of alkanes.

The second catalyst effects a finishing step in that the steam reforming reaction is endothermic and may utilize heat and water generated in the partial oxidation step. Since this is a stable and highly controllable reaction, substantially complete conversion of alkanes may be obtained.

Other objects and advantages of the invention will be apparent to those skilled in the art from a review of the following detailed description, taken in conjunction with the drawing and the appended claims.

BRIEF DESCRIPTION OF THE DRAWING

The drawing is a cross-sectional view of a laboratory scale reactor suitable for use in carrying out the process of the invention.

DETAILED DESCRIPTION OF THE INVENTION

According to the invention, gaseous lower alkanes (e.g. $C_1$-$C_4$ alkanes) are converted to synthesis gas ("syngas") which comprises a gaseous mixture of molecular hydrogen ($H_2$) and carbon monoxide (CO) and which may contain small amounts (e.g. up to 5 vol. %) of carbon dioxide and substantial amounts (e.g. 40-45 vol. %) of molecular nitrogen ($N_2$) by means of catalytic partial oxidation of the alkanes with air and subsequent steam reforming of unconverted alkanes.

The process is especially suitable for conversion of natural gas (typically 85-95 vol. % methane, 2-10 vol. % ethane, and smaller amounts of propane and butane and traces of higher paraffinic hydrocarbons) into synthesis gas having a desirably low molar ratio of hydrogen to carbon monoxide, e.g. less than 3:1 and preferably about 2:1, i.e. in the range of about 1.8:1 to about 2.2:1.

The use of air as an oxygen source may result in the presence of up to about 45 vol. % nitrogen as an inert diluent in the gaseous, syngas-containing product, but the need for a gas separation step to remove nitrogen and any other noncondensable gases is eliminated since, upon subsequent conversion of syngas to liquid (Fischer-Tropsch or methanol) products, the nitrogen can be easily separated and vented to the atmosphere, or used for other purposes.

While the invention is applicable to conversion of lower alkanes generally, it finds special utility in the conversion of natural gas, which is very rich in methane. Reference below to the use of methane as a gaseous feedstock is to be understood to be exemplary only.

According to the invention, partial oxidation of methane to carbon monoxide is carried out according to the following reaction:

$$CH_4 + \tfrac{1}{2}O_2 \rightarrow 2H_2 + CO \qquad (1)$$

Generalized to alkanes, the reaction is set forth as follows:

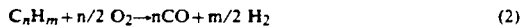
$$C_nH_m + n/2\ O_2 \rightarrow nCO + m/2\ H_2 \qquad (2)$$

The partial oxidation reaction is a rapid, highly exothermic reaction which must be controlled to prevent thermal runaway (which in turn leads to deposition of carbon) and to prevent complete oxidation of a substantial proportion (i.e., preferably less than about 20%, and highly preferably less than 5%) of methane to carbon dioxide and water, which occurs according to the following reaction:

$$CH_4 + 2O_2 \rightarrow CO_2 + 2H_2O \qquad (3)$$

Carbon deposition occurs at high temperatures (e.g. above about 1750° F., depending on residence time) according to the following methane decomposition reaction:

$$CH_4 \rightarrow C + 2H_2 \qquad (4)$$

Carbon deposition is preferably prevented in order to avoid plugging of the catalyst bed, as well as disintegration of catalyst which results from the deposition of carbon inside the catalyst pores which expands as it grows and mechanically destroys the physical integrity of the catalyst.

The process of the invention addresses the problem of how the partial oxidation reaction is controlled, and provides a practical alkane conversion process.

Since partial oxidation of alkanes according to reaction (1) theoretically results in a reaction mixture having a molar $H_2$:CO ratio of about 2:1 and because steam reforming typically generates a product having a higher $H_2$:CO ratio, it is desirable to maximize the yield of product from the partial oxidation step. This must be balanced, however, against the strongly exothermic nature of the partial oxidation reaction and the need to control the temperature thereof.

The feed gas which is subject to partial oxidation must be thoroughly, and preferably continuously mixed in order to avoid oxygen-rich domains in the partial oxidation catalyst bed which would result in local variations in reaction rate which contribute to thermal runaway and resultant carbon deposition. Since the inventive process is desirably carried out at elevated pressure (i.e. greater than atmospheric pressure, e.g. 50-200 psia or more and preferably 50-110 psia), and since mixing efficiency decreases as pressure rises, it is essential that a mixing zone of sufficient size to ensure as thorough mixing of the air and methane-rich feed as possible is provided so as to avoid exotherm formation in the reactor. In general, exotherms in excess of about 225° F. are to be avoided. It has been found that "static" mixing elements or the like disposed in the reactor or in the feedline are suitable. Useful static mixers include those sold under the tradename "Kenics mixers" and others known in the art.

Adequate control of the partial oxidation reaction is facilitated by the use of a partial oxidation catalyst which also has a highly active steam reforming capability. The steam reforming reaction, set forth below, is an endothermic reaction which by its nature produces a hydrogen to carbon monoxide ratio of about 3:1:

$$CH_4 + H_2O \rightleftharpoons CO + 3H_2 \qquad (5)$$

Water is provided for the steam reforming reaction in the partial oxidation and steam reforming catalyst beds by the virtually unavoidable complete oxidation of a small portion (preferably less than 10%) of the methane feed, which generally occurs at the inlet to the partial oxidation catalyst bed. (If necessary due to low levels of complete oxidation, supplemental water may be provided, preferably in the form of steam, from an external source.) Ideally, water is provided only in an amount sufficient to allow control of the partial oxidation reaction temperature. The steam reforming reaction thus behaves as a natural heat sink to control the temperature of the partial oxidation catalyst bed. This is highly preferable over the use of high surface area mechanical heat transfer elements which require a high capital investment.

The endothermic nature of the steam reforming reaction supplements the temperature control effects provided by the presence of a large proportion of nitrogen in the oxidant (air) and the thorough mixing of the air/methane mixture.

Further, since under typical operation conditions the partial oxidation reaction is relatively rapid compared to the steam reforming reactions of the partial oxidation and steam reforming catalysts, it is desirable to use a relatively small partial oxidation catalyst bed and to control flow rates so as to provide a relatively low reactant residence time in order to minimize the amount of methane potentially subject to complete oxidation. Since the residence time is to be minimized, it is desirable that the steam reforming activity of the partial oxidation catalyst be relatively high in order to maintain the catalyst temperature below the methane decomposition temperature. This temperature is believed to be about 1750° F. (depending on residence time), and it is desired to have sufficient steam reforming activity in the oxidation catalyst such that, in combination with the thorough mixing of the air and the methane feed, exotherms in excess of about 225° F. above the reaction temperature, which is preferably in the range of about 1100° F. to about 1750° F., are prevented. The steam reforming activity of the catalyst should be sufficiently high to maintain the temperature of the partial oxidation reaction zone within the desired limits.

It is possible to operate in the partial oxidation catalyst zone at temperatures substantially greater than the preferred maximum of about 1750° F. provided that the residence time is sufficiently low to prevent methane decomposition and resultant carbon (soot) production. For example, temperatures at the entry point (or surface) of the partial oxidation catalyst zone, where complete oxidation (i.e. ignition) of a small amount of feed gas occurs, may reach temperatures of about 2375° F. The temperature quickly drops as the gas flow proceeds through the catalyst bed, however. Methane decomposition can occur even at temperatures lower than 1750° F. if the residence time at such temperatures is sufficiently high. (The rate of methane decomposition is proportional to both temperature and residence time at a given temperature.) It is desirable to maintain the partial oxidation catalyst bed at a relatively high temperature within the desirable operation range of about 1100° F. to about 1750° F., since the efficiency of the entire reaction system improves with higher partial oxidation and steam reforming temperatures, since under adiabatic conditions the need for external heat sources is eliminated.

Under typical operating conditions, it is believed that at least about 20% and preferably at least 50% of the alkanes in the feed will be converted in the partial oxidation reaction zone, and degrees of conversion of in excess of about 80% may be obtainable. The degree of alkane conversion in the partial oxidation stage is directly related to the catalyst activity and residence time (and therefore the size of the catalyst bed), and will determine the amount of heat generated by the partial oxidation reaction. Ideally, a sufficient degree of alkane conversion will be attained that the heat so generated will be sufficient to sustain the steam reforming reactions which occur in the partial oxidation and steam reforming stages of the system, without the need for heat to be supplied from external sources.

According to the invention the alkanes in the feed are preferably completely converted in the partial oxidation and steam reforming stages, and with a maximum of about 20% (and highly preferably no more than about 5%) of the alkanes being completely oxidized to carbon dioxide and water in the partial oxidation stage.

An important function of the partial oxidation catalyst is to control the formation of carbon in order to avoid plugging or mechanical destruction of the catalyst. Although it is desirable to generate synthesis gas at elevated pressure (e.g. about 50 psia or greater) in order to avoid or minimize the need for subsequent compression of syngas-containing products in cases where elevated pressure is desirable to facilitate transmission thereof, high operating pressures require a relatively large gas mixing stage in order to avoid oxygen-rich domains which lead to local increases in temperature which can result in carbon deposition. Since some carbon production may be unavoidable, the oxidation catalyst desirably comprises catalytic means for promoting the following reaction between carbon and water which generates carbon monoxide and hydrogen:

$$C + H_2O \rightarrow CO + H_2 \qquad (6)$$

Steam reforming activity is a function of the partial pressure of water (steam) present in the catalyst bed. It is therefore desirable to maintain a steam partial pressure which is sufficiently high to control the reaction temperature generally within desired limits (i.e. without substantially exceeding the desired maximum temperature). However, it is desirable to avoid exceeding the maximum steam partial pressure necessary to control the temperature since the steam reforming reaction generates three moles of hydrogen per mole of carbon monoxide, and it is therefore desirable to preferentially promote the partial oxidation reaction, which generates only two moles of hydrogen per mole of carbon dioxide.

Successful operation without carbon production at pressures of up to at least about 110 psia has been demonstrated, and it is desirable in some applications (such as methanol synthesis, for example) to operate at pressures of up to 175 psia, and possibly higher. Maximum operable reaction pressure is a function of temperature (and thus reactor geometry as it affects heat transfer capabilities), the quantity of steam present in the reaction mixture (since maximum operable pressure increases as the partial pressure of steam increases), and the size and efficiency of the gas mixing equipment employed, since mixing efficiency decreases with increasing pressure.

It is necessary to maintain the reaction temperature below the carbon production (alkane decomposition) temperature of about 1750° F. (which depends on residence time) or to add small amounts of steam to the reaction mixture if higher pressures are desired.

The ratio of air to methane in the feed to the reactor may be varied within wide limits, with operation in the range of about 1:1 to about 5:1 air:methane on a volume basis being practicable. The degree of conversion generally decreases with a decrease in the air:methane ratio, while the controllability of the reaction becomes more difficult with higher ratios. Thus, it is preferred to operate within a range of air:methane of about 2:1 to about 3.5:1, and a ratio in the range of about 2.8:1 to about 3.1:1 is highly preferred.

Selection of the partial oxidation catalyst is made in view of the desirability of a highly active partial oxidation function because of the need to use a short residence time in order to avoid complete oxidation of substantial amounts of methane. Known suitable highly active partial oxidation catalysts include the so-called "platinum group" metals of Group VIII (CAS notation)

of the periodic table, and preferable catalytic metals include platinum (Pt) and palladium (Pd). A suitable steam reforming catalyst is nickel, although it is believed that manganese, chromium, rhenium, tungsten, and molybdenum may have useful steam reforming activity.

Rhodium is a catalytic material of particular interest in the present invention, since rhodium provides good partial oxidation activity with significantly higher steam reforming activity than nickel. Since a relatively high steam reforming activity is desired in the partial oxidation catalyst due to low residence time, rhodium may be used as the sole partial oxidation catalyst in combination with nickel steam reforming catalyst, or it may be used in combination with nickel and platinum or palladium.

It is highly desirable to include an alkali metal or alkaline earth metal such as lithium, sodium, rubidium, cesium or, preferably, potassium in order to promote the reaction between any carbon which is formed and steam to produce carbon monoxide and hydrogen (Reaction (6)). This is a relatively slow reaction relative to the partial oxidation reaction, however, and therefore is limited in the extent to which it can remove carbon. It is therefore important that the minimum alkane decomposition temperature be avoided in order to avoid carbon production.

The partial oxidation catalyst may conveniently be supported on a conventional refractory support in a form which provides adequate dispersion of the active catalytic metals assuring the lowest attainable pressure drop. As is known in the art, alumina is a convenient form of support.

In the preferred forms of catalysts (Ni+Rh+K or Ni+Pt or Pd+Rh+K) nickel is suitably found in the elemental form and in the form of nickel oxide. However, any nickel oxide formed is generally reduced to elemental form prior to reaction. Platinum and palladium are easily reduced and are found in metallic form under reaction conditions, while potassium is generally found in the form of $K_2O$.

The partial oxidation catalysts preferably comprise about 5 wt. % or less Pt or Pd plus Rh, 5 wt. % or less K, and 10–50 wt. % Ni. Preferably, the catalyst comprises about 1 wt. % Pt or Pd plus Rh and about 1–2 wt. % K, for economy.

The function of the second, steam reforming catalyst is to convert unconverted methane to synthesis gas by the well-known steam reforming reaction. This reaction is endothermic, and utilizes heat generated in the first catalyst bed and, as needed, heat supplied from an external source such as an electric resistance heater. Suitable catalysts include nickel supported on alumina. Such catalysts generally comprise about 10–50 wt. % Ni.

Since the steam reforming reaction is relatively slow, it may be desirable to use a relatively large steam reforming catalyst bed in order to ensure complete conversion of alkanes. The reaction is readily controllable and stable so that the only constraints on the size of the bed are capital costs. Steam may be supplied from an external source as needed.

As is well known in the art, carbon monoxide is subject to disproportionation at temperatures between about 400° F. and about 1100° F. These minimum and maximum disproportionation temperatures are known in the art as "minimum and maximum Boudart temperatures," respectively. The maximum Boudart temperature is generally below the reaction temperature of the partial oxidation and steam reforming catalyst beds, and the minimum Boudart temperature is generally substantially greater than ambient temperature. As a result, it is highly desirable to rapidly quench product gas leaving the reactor to a temperature well below the minimum Boudart temperature in order to avoid loss of carbon monoxide due to disproportionation. This may be accomplished by passing hot product gas through a heat exchanger having a high cooling capability for a short residence time.

The drawing illustrates in cross-section a laboratory scale apparatus which is suitable for carrying out the inventive process. The apparatus, generally designated 10, includes a tubular reactor 12 having an inlet 14 for methane and steam (if necessary), an inlet 16 for air, a static mixer 20 communicating with the inlets 14 and 16, a first reaction zone 22 containing a partial oxidation catalyst communicating with the mixer 20 and a second reaction zone 24 containing reforming catalyst disposed below and communicating with the first reaction zone 22. The reaction zone 24 is surrounded by an electrical heating coil 26 under a nitrogen atmosphere, and terminates in a gas outlet 30 which surrounds a concentric conduit 32 which carries quench water from an external source. The conduit 32 extends upwardly within the gas outlet 30 and quench water spills out of the conduit 32 into the outlet 30 for removal with product gas. A pressure control valve (not shown) disposed in the gas outlet line controls the pressure within the reactor.

The first and second catalyst zones 22 and 24 are surrounded by insulating material 34 in order that the inventive process may be carried out under as nearly adiabatic conditions as possible.

The electric heating coil 26 may not be necessary in a commercial scale reactor, where reactor geometry minimizes heat loss in order to allow adiabatic operation.

EXAMPLES

The apparatus of the drawing was used to evaluate the inventive process according to the following working examples which are presented in order to illustrate the practice of the invention, but are not to be construed as limiting the scope thereof.

EXAMPLE 1

A vertical tube reactor 10 as shown in the drawing having an overall tube length of 47 in included a first reaction zone 22 formed from ceramic material and having a diameter of 0.24 in housing 33.25 in$^3$ (1.63 lb) of Sued-Chemie G 31 K partial oxidation catalyst, which is believed to contain about 1 wt. % palladium. The depth of the catalyst bed was 7.1 in. Directly below the reaction zone 22 was a metallic tubular reactor 24 having an inner diameter of 0.20 in packed with 128.1 in$^3$ (4.1 lb) of nickel steam reforming catalyst (Sued-Chemie G 90 B). Bed depth was 39.3 in. Thermocouples were disposed throughout the partial oxidation and steam reforming sections 22 and 24, respectively, of the reactor.

The entire reactor was heated to a temperature of 542° F. and the catalysts were reduced at that temperature under hydrogen flow. The reactor was then cooled to 482° F. and natural gas comprising 95 vol. % methane and 5 vol. % ethane at a temperature of 485°–496° F. was fed to the reactor at a rate of 70.6 SCFH and air which had been preheated to 500° F. was then introduced at 201.3 SCFH. These flow rates were maintained substantially constant during the tests.

Tests were conducted in six cases at pressures of 51, 52, 81 and 109 psia. In Case 1, steam was added with the natural gas at a rate of 35 SCFH. No steam was introduced in Cases 2-5.

In each case, reformed gas temperatures were measured at the surface of the upper catalyst bed and at eight other points along the bed, and the presence or absence of soot production was noted. The composition of the product gas was analyzed in four cases. Results are reported below in Table 1 below.

A high reaction temperature (in the range of about 2190°-2390° F.) was measured at the upper surface of the partial oxidation catalyst with a temperature drop of about 830° F. to about 905° F. within about the next 0.8 in of catalyst. This is indicative of the high degree of mixing of the reactants.

TABLE 1

|  | Case 1 | Case 2 | Case 3 | Case 4 | Case 5 | Case 6 |
|---|---|---|---|---|---|---|
| Reaction Pressure, psia | 52 | 52 | 51 | 81 | 109 | 109 |
| Feed/Steam Temperature, °F. | 485 | 496 | 485 | 492 | 485 | 485 |
| Reformed Gas Temperatures, °F. | | | | | | |
| Surface | 2190 | 2224 | 2327 | 2337 | 2300 | 2393 |
| Catalyst Bed (Range) | 1363-1414 | 1385-1421 | 1437-1472 | 1462-1517 | 1475-1526 | 1499-1562 |
| Exit | 1526 | 1526 | 1565 | 1580 | 1598 | 1635 |
| Average Catalyst Bed Temperature (excluding surface and exit), °F. | 1385 | 1409 | 1457 | 1490 | 1502 | 1533 |
| Analysis of Dry Reformed Gas, Vol. % | | | | | | |
| $CO_2$ | 4.24 | 1.99 | — | 1.43 | — | 1.82 |
| CO | 14.82 | 17.94 | — | 18.32 | — | 18.22 |
| $H_2$ | 36.91 | 35.98 | — | 34.32 | — | 33.24 |
| $CH_4$ | 0.23 | 0.42 | — | 0.85 | — | 0.65 |
| $N_2$ | 42.29 | 42.78 | — | 44.21 | — | 45.11 |
| $O_2$ + Ar | 0.90 | 0.56 | — | 0.74 | — | 0.75 |
| $H_2$:CO (vol:vol) | 2.49 | 2.01 | — | 1.87 | — | 1.82 |
| Soot Production | No | Yes | No | Yes | Yes | No |

The tests showed that catalytic autothermal [i.e. operation without input of heat from external sources or other forms of external temperature control] reforming up to a reaction pressure of about 109 psia can be conducted free of carbon deposition without the addition of steam. Operation at high pressure (109 psia) without carbon deposition was less reproducible than at lower pressures due to an unfavorable ratio of reactor surface to reaction space for the test equipment which resulted in some deviation from adiabatic conditions.

EXAMPLE 2

Using the reactor and catalysts as described in Example 1, a series of methane conversion tests using a constant molar ratio of air to methane of 2.85 was conducted at pressures of about 51 and 80 psia. The tests demonstrated steam-free reforming of methane with air at 51 psia, and successful soot-free operation at 80 psia with minor amounts of added steam.

Utilizing the start-up and operating conditions as set forth in Example 1 (except that methane was preheated to about 660°-750° F. and air was preheated to about 840°-930° F.) pure methane was reformed with air at a pressure of about 51 psia without the addition of steam for 8 hours without soot formation. Pressure was then increased to about 80 psia. Soot-free operation was observed over a period of 5 hours, after which temperature peaks of more than 2190° F. suddenly occurred in the catalyst inlet zone. At the same time, carbon appeared in the process condensate.

Thereafter, steam was added in amounts of 0.25 and 0.5 moles steam per mole of methane. Successful soot-free operation at 80 psia was experienced at both steam addition levels.

Table 2, below, sets forth the composition and the hydrogen to carbon monoxide ratio of product gas at the reactor outlet.

TABLE 2

| Pressure (psia) | 80 | 80 | 51 | 51 |
|---|---|---|---|---|
| $H_2O$:$CH_4$ (vol/vol) | 0.5 | 0.25 | — | — |
| Reforming Temperature (outlet) (°F.) | 1688 | 1724 | 1760 | 1760 |
| Reformed Gas Composition (Vol. %) | | | | |
| $CO_2$ | 2.9 | 2.3 | 1.1 | 1.2 |
| CO | 16.2 | 16.9 | 18.1 | 18.1 |
| $H_2$ | 37.8 | 37.5 | 36.3 | 36.2 |
| $CH_4$ | 0.1 | 0.2 | 0.1 | 0.2 |
| $N_2$ | 42.1 | 42.3 | 43.5 | 43.4 |
| Ar | 0.6 | 0.8 | 0.9 | 0.9 |
| $H_2$:CO ratio (vol/vol) | 2.33 | 2.22 | 2.01 | 2.00 |

The foregoing description is given for clearness of understanding only, and no unnecessary limitations should be understood therefrom, as modifications within the scope of the invention will be apparent to those skilled in the art.

I claim:

1. A process for converting gaseous lower alkanes to synthesis gas, comprising the steps of:
   (a) thoroughly mixing said alkanes with air to form a homogeneous gaseous mixture;
   (b) subjecting said mixture to simultaneous partial oxidation and steam reforming reactions in a first reaction zone in the presence of a first catalyst having partial oxidation and steam reforming activity and sufficient water to sustain said steam reforming reaction to a degree sufficient to maintain the temperature in said first reaction zone below the decomposition temperature of said alkanes in order to convert a portion of said alkanes to a gaseous first reaction product comprising unconverted alkanes, hydrogen, and carbon monoxide; and
   (c) reacting said unconverted alkanes with water in a second reaction zone in the presence of a second catalyst having steam reforming activity to convert said unconverted alkanes to carbon monoxide and hydrogen to produce a gaseous second reaction product comprising carbon monoxide and hydrogen, said process being carried out under conditions whereby less than about 20% of said alkanes are completely oxidized to carbon dioxide and water.

2. The process of claim 1 wherein said gaseous lower alkanes of said reaction step (a) are in the form of natural gas comprising about 85 to about 95 vol. % methane and about 2 to about 10 vol. % ethane.

3. The process of claim 1 wherein at least about 20% of said alkanes are converted in said reaction step (b).

4. The process of claim 1 wherein at least about 50% of said alkanes are converted in said reaction step (b).

5. The process of claim 1 when said first catalyst has a higher steam reforming activity than said second catalyst and the residence time of said gaseous mixture in said first reaction zone is lower than the residence time of said first reaction product in said second reaction zone.

6. The process of claim 1 wherein said water for said reaction steps (b) and (c) is provided by complete oxidation of a portion of said alkanes in step (b).

7. The process of claim 1 wherein sufficient water is present in step (b) to prevent an exotherm in excess of about 225° F. over the reaction temperature of said step (b).

8. The process of claim 1 wherein said first catalyst comprises a Group VIII metal having partial oxidation activity and a metal having steam reforming activity.

9. The process of claim 8 wherein said first catalyst further comprises an alkali metal or alkaline earth metal which promotes a reaction between carbon and water to produce synthesis gas.

10. The process of claim 9 wherein said Group VIII metal comprises one or more of Pt, Pd and Rh.

11. The process of claim 8 wherein said metal having steam reforming activity is Ni.

12. The process of claim 1 wherein said first catalyst comprises Ni, Rh and K.

13. The process of claim 12 wherein said first catalyst further comprises Pt or Pd.

14. The process of claim 13 wherein said first catalyst comprises about 10 to 50 wt. % Ni, about 5 wt. % or less total Pt, Pd and Rh, and 5 wt. % or less K.

15. The process of claim 1 wherein said second catalyst comprises Ni.

16. The process of claim 1 wherein said steps (b) and (c) are carried out at an elevated pressure.

17. The process of claim 16 wherein said reaction temperature for each of steps (b) and (c) is in the range of about 1100° F. to about 1750° F.

18. The process of claim 16 wherein said reaction temperature is greater than the maximum Boudart carbon monoxide disproportionation temperature, and said second reaction product is rapidly quenched to a temperature below the minimum Boudart carbon monoxide disproportionation temperature.

19. A process for converting gaseous lower alkanes to synthesis gas, comprising the steps of:
(a) thoroughly mixing said alkanes with air to form a homogeneous gaseous mixture;
(b) subjecting said mixture to simultaneous partial oxidation and steam reforming reactions in a first reaction zone in the presence of a first catalyst having partial oxidation and steam reforming activity and sufficient water to sustain said steam reforming reaction to a degree sufficient to maintain the temperature in said first reaction zone below the decomposition temperature of said alkanes in order to convert at least about 20% of said alkanes to a gaseous first reaction product comprising unconverted alkanes, hydrogen, and carbon monoxide; and
(c) reacting said unconverted alkanes with water in a second reaction zone in the presence of a second catalyst having steam reforming activity to convert said unconverted alkanes to carbon monoxide and hydrogen to produce a gaseous second reaction product comprising carbon monoxide and hydrogen,
said first catalyst having a higher steam reforming activity than said second catalyst and the residence time of said gaseous mixture in said first reaction zone being lower than the residence time of said first reaction product in said second reaction zone,
said water for said reaction steps (b) and (c) being provided by complete oxidation of a portion of said alkanes in step (b), and,
said reaction steps (b) and (c) being carried out under conditions including at elevated pressure and a reaction temperature in the range of about 1100° F. to 1750° F. wherein sufficient water is present in step (b) to prevent an exotherm in excess of about 225° F. over said reaction temperature and whereby less than about 20% of said alkanes are completely oxidized to carbon dioxide and water.

20. The process of claim 19 wherein said gaseous lower alkanes of said reaction step (a) are in the form of natural gas comprising about 85 to about 95 vol. % methane and about 2 to about 10 vol. % ethane.

21. The process of claim 19 wherein at least about 50% of said alkanes are converted in said reaction step (b).

22. The process of claim 19 wherein said first catalyst comprises a Group VIII metal having partial oxidation activity, a metal having steam reforming activity, and an alkali metal or alkaline earth metal which promotes a reaction between carbon and water to produce synthesis gas.

23. The process of claim 22 wherein said first catalyst comprises Ni, Rh and K and said second catalyst comprises Ni.

24. The process of claim 23 wherein said first catalyst further comprises Pt or Pd.

25. The process of claim 24 wherein said first catalyst comprises about 10 to 50 wt. % Ni, about 5 wt. % or less total Pt, Pd and Rh, and 5 wt. % or less K.

26. The process of claim 19 wherein said reaction temperature is greater than the maximum Boudart carbon monoxide disproportionation temperature, and said second reaction product is rapidly quenched to a temperature below the minimum Boudart carbon monoxide disproportionation temperature.

27. A process for converting natural gas comprising $C_1$ to $C_4$ alkanes to synthesis gas, comprising the steps of:
(a) thoroughly mixing said natural gas with air to form a homogeneous gaseous mixture;
(b) subjecting said mixture to simultaneous partial oxidation and steam reforming reactions in a first reaction zone in the presence of a first catalyst having partial oxidation and steam reforming activity and comprising a Group VIII metal having partial oxidation activity, a metal having steam reforming activity, and an alkali metal or alkaline earth metal which promotes a reaction between carbon and water to produce synthesis gas, and sufficient water to sustain said steam reforming reaction to a degree sufficient to maintain the temperature in said first reaction zone below the decomposition temperature of each of said alkanes in order to convert at least about 50% of said alkanes to a gaseous first reaction product comprising unconverted alkanes, hydrogen, and carbon monoxide;

(c) reacting said unconverted alkanes with water in a second reaction zone in the presence of a second catalyst having steam reforming activity to convert said unconverted alkanes to carbon monoxide and hydrogen to produce a gaseous second reaction product comprising carbon monoxide and hydrogen; and, (d) rapidly quenching said second reaction product to a temperature below the minimum Boudart carbon monoxide disproportionation temperature, said first catalyst having a higher steam reforming activity than said second catalyst and the residence time of said gaseous mixture in said first reaction zone being lower than the residence time of said first reaction product in said second reaction zone, said water for said reaction steps (b) and (c) being provided by complete oxidation of a portion of said alkanes in step (b), and, said reaction steps (b) and (c) being carried out under conditions including elevated pressure and a reaction temperature in the range of about 1100° F. to 1750° F. and greater than the maximum Boudart carbon monoxide disproportionation temperature wherein sufficient water is present in step (b) to prevent an exotherm in excess of about 225° F. over said reaction temperature and whereby less than about 20% of said alkanes are completely oxidized to carbon dioxide and water.

28. The process of claim 27 wherein said natural gas comprises about 85 to about 95 vol. % methane and about 2 to about 10 vol. % ethane.

29. The process of claim 27 wherein said first catalyst comprises Ni, Rh and K and a metal selected from the group consisting of Pt and Pd and said second catalyst comprises Ni.

30. The process of claim 29 wherein said first catalyst comprises about 10 to 50 wt. % Ni, about 5 wt. % or less total Pt, Pd and Rh, and 5 wt. % or less K.

* * * * *